(12) United States Patent
Choi et al.

(10) Patent No.: US 8,274,626 B2
(45) Date of Patent: Sep. 25, 2012

(54) DIFFUSER PRISM SHEET WITH LIGHT DIFFUSING ELEMENT ON VALLEY REGION, LCD BACK LIGHT UNIT INCLUDING THE SAME, AND LCD DEVICE INCLUDING THE SAME

(75) Inventors: Jun Hyeak Choi, Uiwang-si (KR); Man Suk Kim, Uiwang-si (KR); Ju Yeol Choi, Uiwang-si (KR); Seok Hoon Jang, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 385 days.

(21) Appl. No.: 12/585,372

(22) Filed: Sep. 14, 2009

(65) Prior Publication Data

US 2010/0007821 A1    Jan. 14, 2010

Related U.S. Application Data

(63) Continuation of application No. PCT/KR2008/001435, filed on Mar. 14, 2008.

(30) Foreign Application Priority Data

Mar. 15, 2007 (KR) .................. 10-2007-0025468
Mar. 11, 2008 (KR) .................. 10-2008-0022438

(51) Int. Cl.
  *G02F 1/1335* (2006.01)
  *F21V 7/04* (2006.01)

(52) U.S. Cl. .............. 349/112; 349/57; 349/61; 349/62; 349/63; 349/64; 349/65; 362/558

(58) Field of Classification Search ............... 349/57, 349/61–65, 112; 362/558
See application file for complete search history.

(56) References Cited

U.S. PATENT DOCUMENTS

| 5,801,795 | A  | * | 9/1998  | Ogino ........................... 349/5 |
| 6,798,574 | B2 | * | 9/2004  | Kim .............................. 359/566 |
| 7,382,537 | B2 | * | 6/2008  | Lin ............................... 359/625 |
| 7,474,464 | B2 | * | 1/2009  | Wang et al. ................... 359/599 |
| 2006/0227323 | A1 | * | 10/2006 | Goto ............................ 356/336 |
| 2008/0088933 | A1 | * | 4/2008  | Lin ............................... 359/599 |
| 2008/0151375 | A1 | * | 6/2008  | Lin ............................... 359/599 |
| 2009/0059128 | A1 | * | 3/2009  | Han et al. ..................... 349/65 |
| 2010/0103351 | A1 | * | 4/2010  | Han et al. ..................... 349/65 |

FOREIGN PATENT DOCUMENTS

| JP | 09-211227 A | | 8/1997 |
| JP | 09304607 A | * | 11/1997 |
| KR | 10-2001-0048770 A | | 6/2001 |
| KR | 10-2005-0092257 A | | 9/2005 |

* cited by examiner

*Primary Examiner* — Hoan C Nguyen
(74) *Attorney, Agent, or Firm* — Lee & Morse, P.C.

(57) ABSTRACT

A diffuser prism sheet, an LCD back light unit including the same, and an LCD device including the same, the diffuser prism sheet including a base film made of a transparent material, and a light refracting part on a surface of the base film, the light refracting part including a plurality of unit prisms arranged in one direction, having a predetermined cross-sectional shape and valley regions between adjacent unit prisms, and light diffusing elements in the valley regions between the adjacent unit prisms.

13 Claims, 4 Drawing Sheets

[FIG. 1]
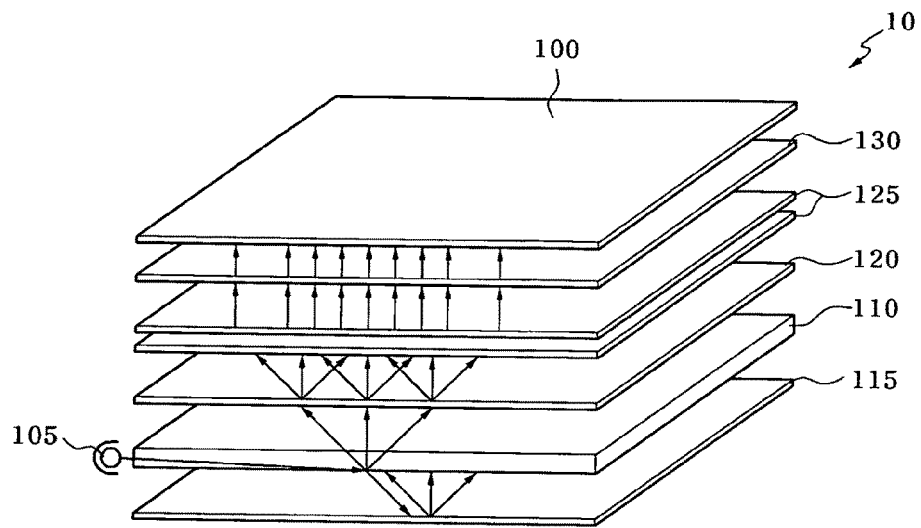
[FIG. 2]
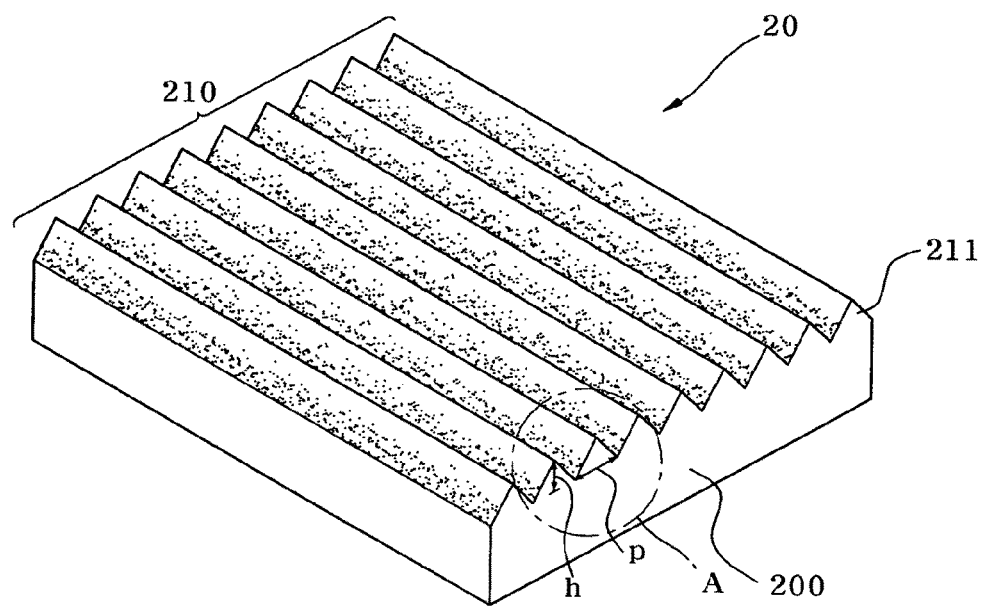

[FIG. 3]
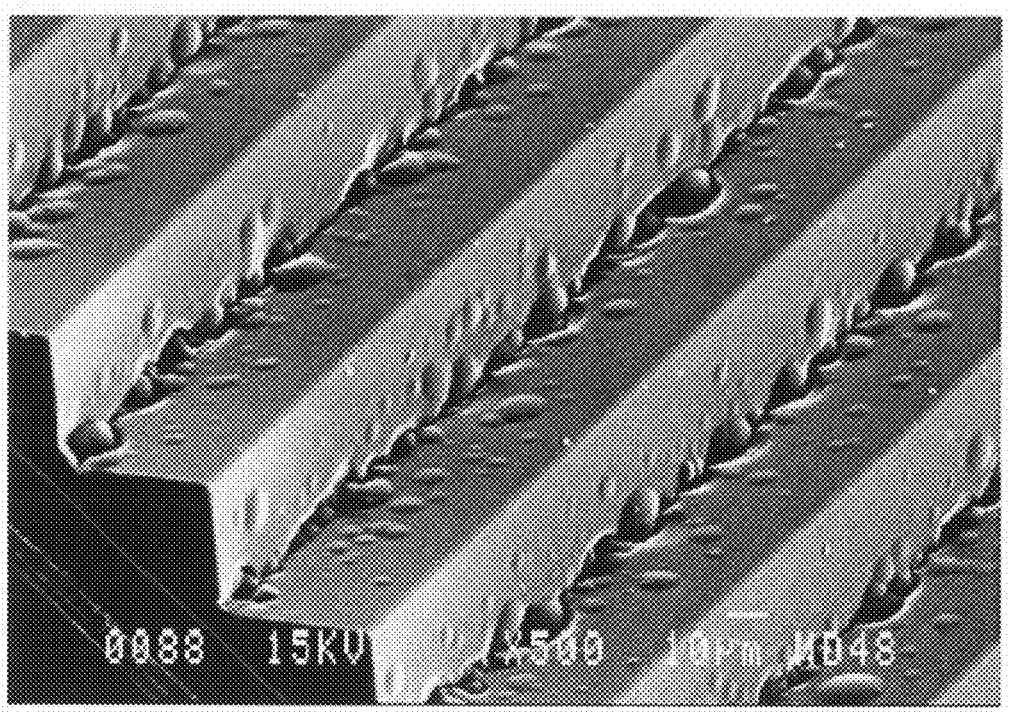
[FIG. 4]
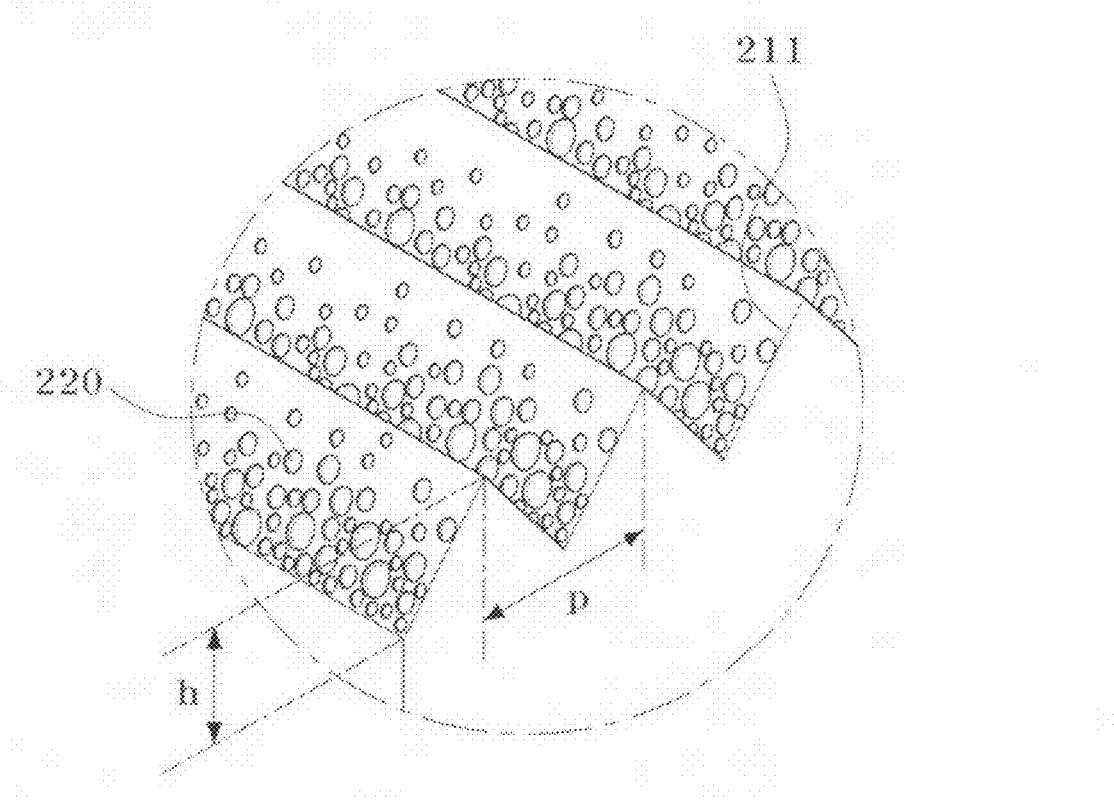

[FIG. 5]
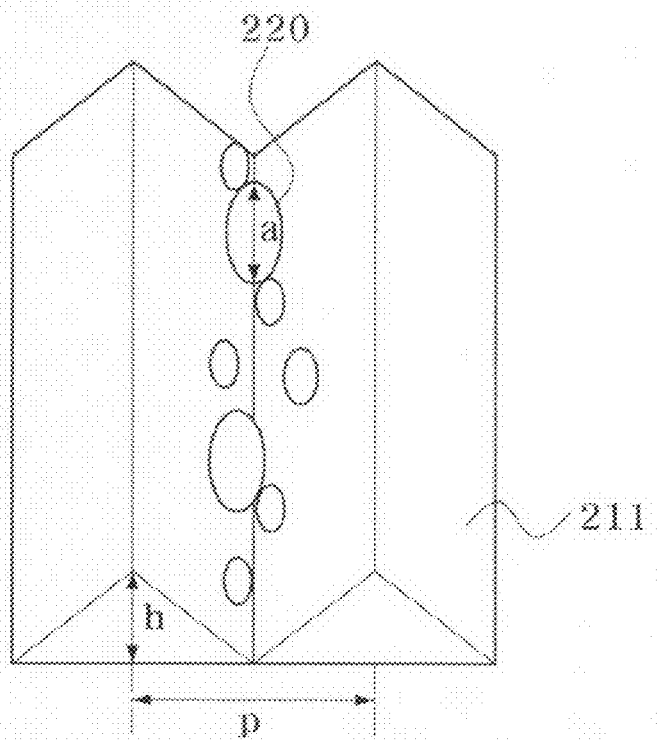
[FIG. 6]
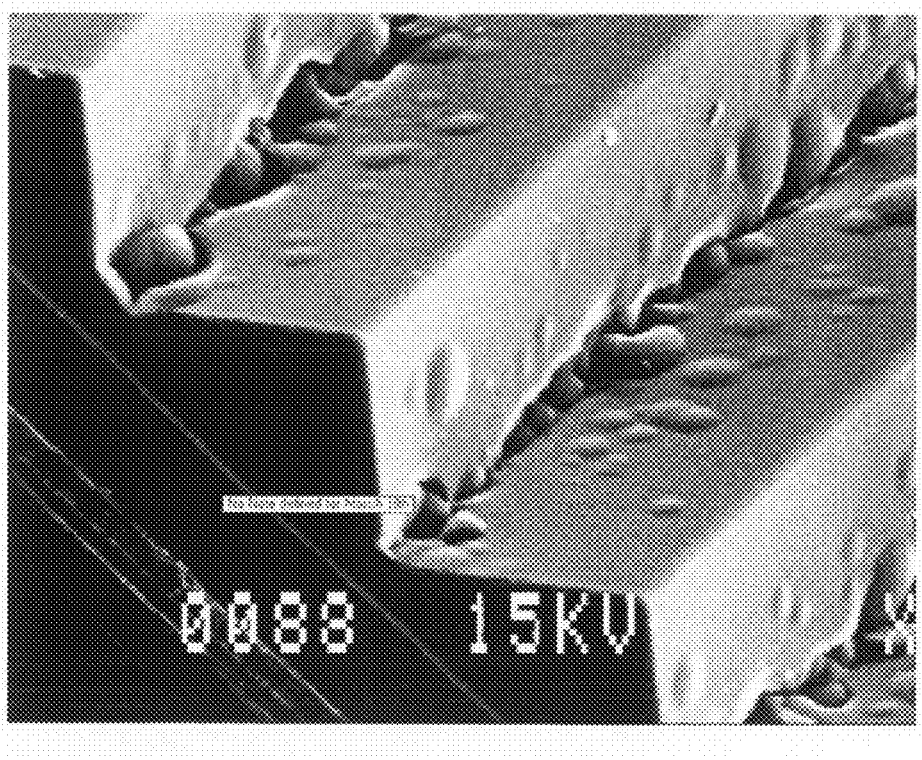

[FIG. 7]
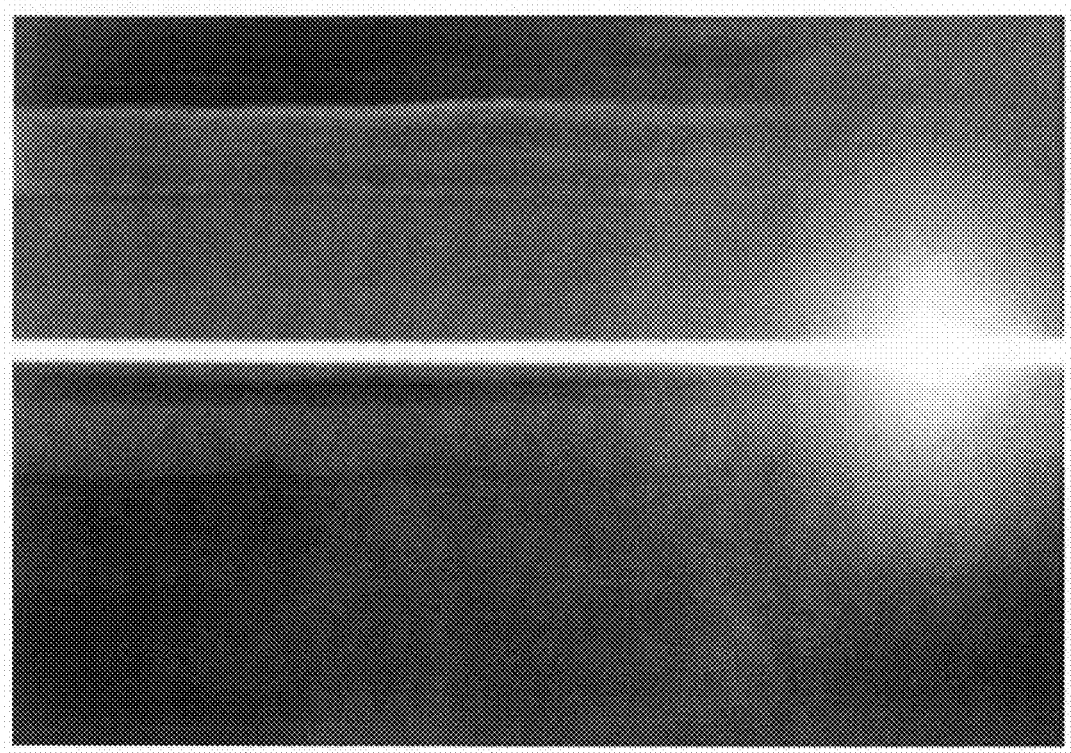
[FIG. 8]
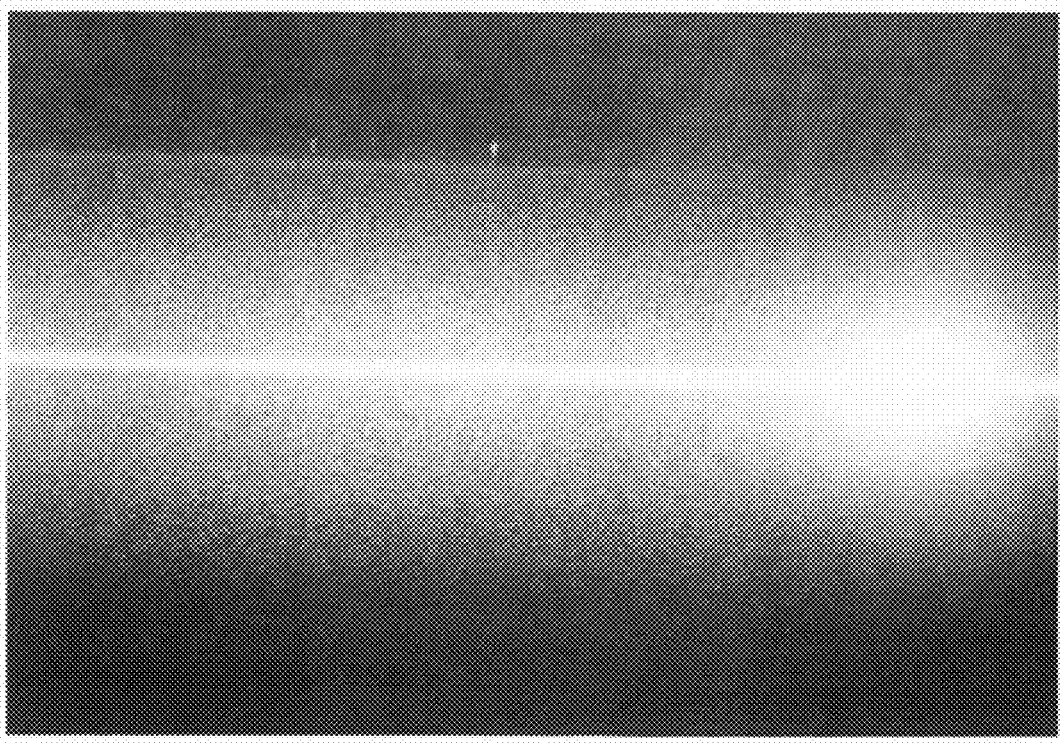

DIFFUSER PRISM SHEET WITH LIGHT DIFFUSING ELEMENT ON VALLEY REGION, LCD BACK LIGHT UNIT INCLUDING THE SAME, AND LCD DEVICE INCLUDING THE SAME

This is a continuation application based on pending application Serial No. PCT/KR2008/001435, filed on Mar. 14, 2008, the entire contents of which is hereby incorporated by reference.

BACKGROUND

1. Field

Embodiments relate to a diffuser prism sheet, a liquid crystal display (LCD) back light unit including the same and an LCD device including the same.

2. Description of the Related Art

In general, a liquid crystal display (LCD) device is a device that may display numerals or images through application of an electric field to liquid crystals disposed between two glass substrates having electrodes therebetween. The liquid crystals may be made of a material having an intermediate phase between a liquid and a solid.

Since LCD devices are not self-luminescent, they may include a back light unit to generate light. An image may be displayed in such a manner that transmittance of light generated from the back light unit is adjusted in a liquid crystal panel, in which liquid crystals are uniformly arranged.

SUMMARY

Embodiments are directed to a diffuser prism sheet, an LCD back light unit including the same and an LCD device including the same, which substantially overcome one or more of the drawbacks, limitations and/or disadvantages of the related art.

It is a feature of an embodiment to provide a diffuser prism sheet that effectively diffuses and refracts light to have a uniform orientation.

It is another feature of an embodiment to provide an LCD back light unit having light diffusing and transmitting capability with high brightness.

It is another feature of an embodiment to provide a diffuser prism sheet that eliminates the need for a separate diffusion sheet, thereby reducing manufacturing costs.

At least one of the above and other features and advantages may be realized by providing a diffuser prism sheet including a base film made of a transparent material, and a light refracting part on a surface of the base film, the light refracting part including a plurality of unit prisms arranged in one direction, having a predetermined cross-sectional shape and valley regions between adjacent unit prisms, and light diffusing elements in the valley regions between the adjacent unit prisms.

Each of the unit prisms may have a height, and at least about 50% of the light diffusing elements may be distributed on portions of the valley regions under a half of a height of each of the unit prisms.

At least about 70% of the light diffusing elements may be distributed on portions of the valley regions under a half of a height of each of the unit prisms.

The light diffusing elements may be integrally formed with the light refracting part, and may be randomly distributed on the valley regions of the unit prisms.

The base film may include at least one of glass, a synthetic resin and a metal thin film.

The predetermined cross-sectional shape of the unit prisms may include one of a triangle shape, a semicircle shape or a trapezoid shape.

Each of the unit prisms may have a triangle-shaped cross section, and a vertex angle of each of the unit prisms may be about 30 to about 120 degrees.

The plurality of unit prisms may be formed successively without a gap therebetween.

The plurality of unit prisms may be arranged with a flat plane therebetween at regular intervals.

Each of the unit prisms may have a height of about 5 μm to about 500 μm.

The light diffusing elements may have a circular lens shape having a diameter, the unit prisms may have a pitch, and the diameter of the light diffusing elements may be about 0.01 to about 0.9 times larger than the pitch of the unit prisms.

The light diffusing elements may have an oval lens shape having a long diameter, the unit prisms may have a pitch, and the long diameter of the light diffusing elements may be about 0.01 to about 0.9 times the pitch of the unit prisms.

At least one of the above and other features and advantages may also be realized by providing an LCD back light unit including a light guide plate; a light source disposed at one of a side surface or a rear surface of the light guide plate; and the diffuser prism sheet of an embodiment, the diffuser prism sheet being on a surface of the light guide plate and being configured to refract and diffuse light.

At least one of the above and other features and advantages may also be realized by providing an LCD device including a display panel, and the back light unit of an embodiment.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 illustrates an exploded perspective view of a back light unit of an LCD device;

FIG. 2 illustrates a perspective view schematically showing a diffuser prism sheet according to an embodiment;

FIG. 3 illustrates an image of a diffuser prism sheet according to an embodiment;

FIG. 4 illustrates an enlarged perspective view of an "A" portion in FIG. 2;

FIG. 5 illustrates a perspective view of a pattern of light diffusing elements on a surface of the diffuser prism sheet of an embodiment;

FIG. 6 illustrates an enlarged view of the image of FIG. 3;

FIG. 7 illustrates an image of a diffuser prism sheet manufactured according to a Comparative Example; and FIG. 8 illustrates an image of a diffuser prism sheet manufactured according to Experimental Example 1.

DETAILED DESCRIPTION

Korean Patent Application No. 10-2007-0025468, filed on Mar. 15, 2007, in the Korean Intellectual Property Office, and Korean Patent Application No. 10-2008-0022438, filed on Mar. 11, 2008, in the Korean Intellectual Property Office, are incorporated by reference herein in their entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an exploded perspective view showing a back light unit of an LCD device. As shown in FIG. 1, an LCD back light unit may include a light source 105, a light guide plate 110, a reflection plate 115, a diffusion sheet 120, prism sheets 125 and a protective sheet 130.

The light source 105 may emit light in the LCD device. Various types of light sources may be used, e.g., a cold cathode fluorescence lamp (CCFL), as the light source 105, which may have a low power consumption and emit very bright white light.

The light guide plate 110 may be disposed below an LCD panel 100 and near a side of the light source 105. The light guide plate 110 may convert spot light generated from the light source 105 into plane light, and then project the plane light towards the LCD panel 100.

The reflection plate 115 may be disposed below the light guide plate 110. The reflection plate 115 may reflect light emitted from the light source 105 toward the LCD panel 100 in front of the reflection plate 115.

The diffusion sheet 120 may be disposed above the light guide plate 110. The diffusion sheet 120 may give light passing through the light guide plate 110 a uniform orientation.

While passing through the diffusion sheet 120, the light may be diffused in horizontal and vertical directions and brightness may be rapidly deteriorated. In this regard, the prism sheets 125 may be used to, e.g., refract and concentrate the light, to thereby enhance brightness. Two prism sheets may be arranged perpendicular to each other.

The protective sheet 130 may be disposed above the prism sheets 125. The protective sheet 130 may prevent scratches on the prism sheets 125. The protective sheet 130 may also prevent a Moire effect, i.e., interference pattern, from occurring when using the prism sheets 125 arranged in two layers in vertical and horizontal directions.

Each of the prism sheets 125 may be configured such that a plurality of unit prisms are arranged successively with regular orientation on a surface of a film made of a transparent material. The prism sheet 125 may refract light from the light guide plate 110 and diffused through the diffusion sheet 120 to have a regular orientation.

In general, if a width of light transmission and reflection is narrow, the light may appear relatively bright in a region of light transmission and reflection. Conversely, if a width of light transmission and reflection is broad, the region of light transmission and reflection may become broad, but brightness may be lower.

Recently, the development of LCDs has included a large-scale panel of, e.g., greater than about 40 inches. Maintaining the intensity of light from the back light over a predetermined level and uniformly distributing the light onto an object surface to be viewed may be important factors in LCD technology.

A critical value of the brightness of light exists, i.e., a value which the brightness of light should exceed. In particular, by virtue of recent developments in light sources, the intensity of light emitted from the light source may be sufficiently large. Thus, it may be relatively easy to secure light intensity above a predetermined level. Accordingly, many studies have been performed on techniques for efficiently diffusing the light so as to be uniformly distributed onto a whole area of the large-scale panel.

A diffuser prism sheet 20 according to an embodiment may include a base film 200 made of a transparent material having a light refracting part 210 on a surface of the base film 200. The light refracting part 210 may include a plurality of unit prisms 211 arranged in one direction and having a predetermined cross sectional shape and height. Light diffusing elements 220 may be formed between adjacent unit prisms 211 of the light refracting part 210, i.e., on valley regions. At least about 50% of the light diffusing elements 220 may be distributed on portions of the valley regions under half of the height of each of the unit prisms 211.

FIG. 2 illustrates a perspective view of a diffuser prism sheet according to an embodiment. FIG. 3 illustrates an image of a diffuser prism sheet according to an embodiment. FIG. 4 illustrates an enlarged perspective view of an "A" portion in FIG. 2. FIG. 6 illustrates an enlarged view of the image of FIG. 3.

As illustrated in FIGS. 2 and 4, a diffuser prism sheet 20 according to an embodiment may include a base film or base part 200 and a light refracting part 210 having light diffusing elements 220 thereon.

The base film or part 200 may serve as a base layer of the diffuser prism sheet. The base film or part 200 may be made of a transparent material, e.g., transparent synthetic resin, glass, metallic thin film, etc. The transparent synthetic resin may include, e.g., polyethylene, polypropylene, polycarbonate, etc. A thickness of the base part 200 may be about several micrometers (μm).

The light refracting part 210 may refract light transmitting through the base part 200, to thereby provide the light with a uniform orientation. The light refracting part 210 may be formed on one surface of the base part 200.

In an embodiment, the light refracting part 210 may include repeating prism shapes. The light refracting part 210 may include a plurality of unit prisms 211 to refract the light transmitted through the base film 200 in a predetermined direction.

Although it is illustrated in FIGS. 2 and 4 that each of the unit prisms 211 of the light refracting part 210 has a triangle-shaped cross section and has a trigonal prism shape as a whole, the cross sectional shape of the unit prisms 211 of the light refracting part 210 is not limited to the triangular shape. The unit prisms may have a cross section of, e.g., a semicircular shape (i.e., a semicylindrical shape or a lenticular shape) or any other suitable shape capable of refracting light. For example, the unit prisms may include a transparent member having at least two optical planes capable of refracting light, in which at least one pair of surfaces of the optical planes are not parallel with each other, e.g., a trapezoidal cross sectional shape.

When manufacturing the diffuser prism sheet 20 of an embodiment, the cross-sectional shape of the unit prisms 211 may depend on desired features of a device to which the prism sheet will be applied, e.g., a desired sight angle, a screen size, etc.

The plurality of unit prisms 211 of the light refracting part 210 may be arranged in one direction. The plurality of unit prisms 211 may be formed successively, i.e., without a gap therebetween. However, when straightness of light is preferred over refraction of light, flat planes may be formed between the unit prisms 211. In other words, the unit prisms 211 may be arranged with a regular gap therebetween, instead of successively.

It is preferred that a height of each of the unit prisms 211 is about 5 μm to about 500 μm. The height of each of the unit prisms may not be uniform, and the height is defined as an average height. When the unit prism 211 has a triangle-shaped cross section, a vertex angle (θ) is preferably about 30 to about 120 degrees.

Referring to FIG. 4, the light diffusing elements 220 may be randomly distributed on a lower portion of the light refracting part 210, i.e., lower portions of valley regions between the adjacent unit prisms 211. The light diffusing elements 220 may include, e.g., circle-shaped lenses and/or oval-shaped lenses.

The light diffusing elements 220 may cover the surface of the light refracting part 210 in such a manner that a plurality of lens-shaped elements having a round end surface are distributed either in contact with each other or apart from each other. The light diffusing elements 220 may have in a concave-convex form on the lower portions of the unit prisms 211.

A size of a light diffusing portion of the light refracting part 210, including the light diffusing element 220, may be smaller than a size of a light refracting portion of the light refracting part 210, not including the light diffusing elements 220. In particular, when the light diffusing elements 220 include a circular lens, a ratio of a diameter of the lens to a pitch (P) of the unit prisms 211 (diameter/pitch ratio) is preferably about 0.01 to about 0.9. When the light diffusing elements 220 include an oval lens, a ratio of a long diameter of the lens to the pitch (P) of the unit prisms 211 (long diameter/pitch ratio) is preferably about 0.01 to about 0.9. A ratio of a height of the light diffusing portion, i.e., the height from the bottom of the valley region to the highest light diffusing element 220 on a unit prism 211, to a height of the light refracting portion, i.e., the height (h) of the unit prism 211, is preferably about 0.01 to about 0.9. The above ratios may be adjusted in consideration of the desired light diffusing effect and the light refracting feature of the light diffusing portion.

The light diffusing elements 220 may diffuse light transmitted through the base part 200 by only a very small amount. Here, to diffuse the light by a very small amount means to diffuse the light maximally to the ambient while maintaining a brightness reduction ratio of the refracted light of about 5 to about 10%.

Preferably, at least about 50%, and more preferably at least about 70%, of the light diffusing elements 220 are distributed on the surface of valley regions between the unit prisms 211, especially valley regions under a half of the height (h) of the unit prism 211. That is, the light diffusing elements 220 may be more densely distributed on a lower portion of valley regions between each unit prism 211 than on an upper portion of the unit prism 211. More particularly, the light diffusing elements 220 may be more densely distributed on surfaces of the valley regions under a half of the height (h) of the unit prism 211 (at least about 50% and below about 100%). Given a set number of light diffusing elements 220, arranging the light diffusing elements 220 on lower surfaces of the valley regions may result in improvement of various properties.

The light diffusing elements 220 may haze an exterior appearance of the optical sheet, thereby enhancing concealment of inferior points, i.e., defects. However, the light diffusing elements 220 may change an optical path and thereby decrease brightness of the back light.

Comparing brightness properties of a diffuser prism sheet of an embodiment and a diffuser prism sheet having evenly distributed light diffusing elements 220 on all portions of the unit prisms 211, it may be seen that the brightness properties are improved when the light diffusing elements 220 are more densely distributed on the lower portions of the valley regions.

Although it has been illustrated and described in FIG. 4 that the light diffusing elements 220 include circle-shaped lenses, the light diffusing elements 220 may include oval-shaped lenses or both the circle-shaped and oval-shaped lenses as illustrated in FIG. 5. The light diffusing elements 220 between the unit prisms 211 may include oval-shaped lenses, and the above-described long diameter of the oval-shaped lens may be indicated by a reference letter a.

In general, the diffuser prism sheet 20 of an embodiment may be manufactured in such a manner that a mold having a recessed pattern may be pressed to a transparent film having a uniform thickness to form an embossed prism shape, corresponding to the recessed pattern, on the surface of the transparent film. Thus, an upper portion of the transparent film may form the light refracting part 210 having the prism shape, and a lower portion of the transparent film may form the base part 200.

In order to simultaneously form the light refracting part 210 and the light diffusing elements 220 during the manufacturing process of the diffuser prism sheet, concave-convex portions may be formed on the surface of the mold having the recessed pattern. A pressing process may then be carried out using the mold. As a result, it is possible to manufacture the diffuser prism sheet 20 having an integrally formed light refracting part 210 and light diffusing elements 220.

FIGS. 3 and 6 illustrate images of the surface of a diffuser prism sheet manufactured according to the above method. Referring to FIGS. 3 and 6, the light refracting part having repeated prism shapes may be formed on a film having a predetermined thickness. The light diffusing elements may be formed in a circle or oval lens shape on the lower portion of the light refracting part, i.e., on lower portions of the valley regions between the adjacent unit prisms.

The above-described diffuser prism sheet 20 may be disposed on a surface of a light guide plate, from which the light progresses. By use of the diffuser prism sheet of an embodiment, a separate diffusion sheet may be eliminated.

The diffuser prism sheet 20 of an embodiment may be used in both an edge type LCD back light unit, in which the light source is disposed at a side surface of the light guide plate, and a direct type LCD back light unit, in which the light source is disposed at a lower surface of the light guide plate. Also, any one of, e.g., a CCFL and an LED, may be used as the light source.

It is preferred that the light diffusing elements 220 are integrally formed with the light refracting part 210. Forming the light diffusing part separately from the light refracting part by use of an adhesive resin, e.g., beads, is undesirable.

Hereinafter, examples will be explained, which show that a back light unit manufactured by using a diffuser prism sheet according to the embodiments exhibits good haze (which refers to the degree of light scattering) and transmittance properties without a large decrease of brightness. Since the non-described technical contents are well known to a person who is skilled in the art, an explanation thereof will be omitted.

EXPERIMENTAL EXAMPLE 1

A diffuser prism sheet was manufactured such that the unit prisms each had a triangle-shaped cross section having a vertex angle of 90 degrees and an average height and pitch of approximately 50 µm. The lens shaped light diffusing elements were randomly distributed on lower portions of valley regions between the unit prisms of the light refracting part. The light diffusing elements had a diameter of 0.1 to 0.8 times the pitch of the unit prisms. Approximately 60% of the light diffusing elements were distributed on portions of the valley regions under a half of the height of the unit prisms.

EXPERIMENTAL EXAMPLE 2

Experimental Example 2 was the same as Experimental Example 1, except that approximately 70% of the light diffusing elements were distributed on portions of the valley regions under a half of the height of the unit prisms.

EXPERIMENTAL EXAMPLE 3

Experimental Example 3 was the same as Experimental Example 1, except that approximately 80% of the light diffusing elements were distributed on portions of the valley regions under a half of the height of the unit prisms.

COMPARATIVE EXAMPLE

A Comparative Example, which may also be considered an embodiment, was the same as Experimental Example 1, except that approximately 40% of the light diffusing elements were distributed on portions of the valley regions under a half of the height of the unit prisms.

A comparative test of the above Experimental Examples and Comparative Example was performed such that physical properties of the transparent film e.g., kind, transparency, haze and thickness, used in the Experimental Examples were the same as those of the transparent used in the Comparative Example. Surface brightness, haze and transmittance of the diffuser prism sheets of the Experimental and Comparative Examples manufactured as described above were measured.

FIG. 7 illustrates an image of the diffuser prism sheet manufactured according to the Comparative Example. FIG. 8 illustrates an image of the diffuser prism sheet manufactured according to Experimental Example 1. The following Table 1 shows the measured results of brightness, haze and transmittance of the diffuser prism sheets manufactured according to the Comparative and Experimental Examples.

TABLE 1

| | Brightness (cd/m²) | Haze (%) | Transmittance (%) |
|---|---|---|---|
| Experimental Example 1 | 5638 | 90.0 | 12.4 |
| Experimental Example 2 | 5530 | 91.8 | 16.2 |
| Experimental Example 3 | 5423 | 93.0 | 19.04 |
| Comparative Example | 5710 | 83.0 | 9.0 |

It can be seen in FIG. 7 that the Comparative Example exhibited superior center brightness, but exhibited inferior light diffusion. In particular, the above Table 1 shows that the Comparative Example had center brightness of 5710 cd/m², haze of 83.0% and transmittance of 9.0%.

It can be seen in FIG. 8 that the center brightness of Experimental Example 1 was slightly decreased (however, almost equivalent) when compared to the Comparative Example. However, the light diffusion of the Experimental Example was much greater than that of the Comparative Example. In particular, Table 1 shows that the Experimental Example 1 exhibited a center brightness of 5638 cd/m², a haze of 90.0% and a transmittance of 12.4%. Experimental Example 2 exhibited a center brightness of 5530 cd/m², a haze of 91.8% and a transmittance of 16.2%. Experimental Example 3 exhibited a center brightness of 5423 cd/m², a haze of 93.0% and a transmittance of 19.04%.

In other words, the use of the diffuser prism sheet according to an embodiment may result in a remarkable improvement of diffusion properties of an optical sheet (see FIG. 8), in spite of a small decrease, e.g., less than about 5 to about 10%, of the center brightness, when compared to the diffuser prism sheet having a less dense distribution of light diffusing elements 220, although the latter may also be a particular, different embodiment. Table 1 also shows that transmittance increased as the density of the light diffusing elements 220 in the lower part of the 210 of the diffuser prism sheet increased, which may be due to, e.g., retroreflection characteristics of the prism film.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A diffuser prism sheet, comprising:
a base film made of a transparent material, and
a light refracting part on a surface of the base film, the light refracting part including a plurality of unit prisms arranged in one direction, having a predetermined cross-sectional shape and valley regions between adjacent unit prisms, and light diffusing elements in the valley regions between the adjacent unit prisms,
wherein:
each of the unit prisms has a height, and
at least about 60% of the light diffusing elements are distributed on portions of the valley regions under a half of a height of each of the unit prisms.

2. The diffuser prism sheet as claimed in claim 1, wherein at least about 70% of the light diffusing elements are distributed on portions of the valley regions under a half of a height of each of the unit prisms.

3. The diffuser prism sheet as claimed in claim 1, wherein the light diffusing elements:
are integrally formed with the light refracting part, and
are randomly distributed on the valley regions of the unit prisms.

4. The diffuser prism sheet as claimed in claim 1, wherein the base film includes at least one of glass, and a synthetic resin.

5. The diffuser prism sheet as claimed in claim 1, wherein the predetermined cross-sectional shape of the unit prisms includes one of a triangle shape, a semicircle shape or a trapezoid shape.

6. The diffuser prism sheet as claimed in claim 5, wherein:
each of the unit prisms has a triangle-shaped cross section, and
a vertex angle of each of the unit prisms is about 30 to about 120 degrees.

7. The diffuser prism sheet as claimed in claim 1, wherein the plurality of unit prisms are formed successively without a gap therebetween.

8. The diffuser prism sheet as claimed in claim 1, wherein the plurality of unit prisms are arranged with a flat plane therebetween at regular intervals.

9. The diffuser prism sheet as claimed in claim 1, wherein each of the unit prisms has a height of about 5 μm to about 500 μm.

10. The diffuser prism sheet as claimed in claim 1, wherein:
the light diffusing elements have a circular lens shape having a diameter,
the unit prisms have a pitch, and
the diameter of the light diffusing elements is about 0.01 to about 0.9 times larger than the pitch of the unit prisms.

11. The diffuser prism sheet as claimed in claim 1, wherein:
the light diffusing elements have an oval lens shape having a long diameter,
the unit prisms have a pitch, and
the long diameter of the light diffusing elements is about 0.01 to about 0.9 times the pitch of the unit prisms.

12. An LCD back light unit, comprising:
a light guide plate;
a light source disposed at one of a side surface or a rear surface of the light guide plate; and
the diffuser prism sheet as claimed in claim 1, the diffuser prism sheet being on a surface of the light guide plate and being configured to refract and diffuse light.

13. An LCD device, comprising:
a display panel; and
the back light unit as claimed in claim 12.

* * * * *